United States Patent

[11] 3,593,275

[72] Inventor Gerhard Pumpe
Munich, Germany
[21] Appl. No. 743,392
[22] Filed July 9, 1968
[45] Patented July 13, 1971
[73] Assignee Siemens Aktiengesellschaft
Berlin and Munich, Germany
[32] Priority July 21, 1967
[33] Germany
[31] P 15 37 338.3

[54] METHOD AND APPARATUS FOR THE RECOGNITION OF ERRORS AT THE RECEIVER IN A DATA TRANSMISSION SYSTEM
7 Claims, 13 Drawing Figs.

[52] U.S. Cl. .......... 340/146.1, 179/84, 325/31, 325/41, 325/134, 178/69
[51] Int. Cl. .......... H04l 1/04, H04l 1/10, G08c 25/00
[50] Field of Search .......... 340/146.1; 307/233; 325/31, 41, 42, 52, 65, 134, 324; 178/69; 179/1, 1.2, 84 SS

[56] References Cited
UNITED STATES PATENTS
3,131,264 4/1964 Chittleburgh et al. .......... 179/84
3,104,356 9/1963 Hedger .......... 325/31

*Primary Examiner*—Malcolm A. Morrison
*Assistant Examiner*—R. Stephen Dildine, Jr.
*Attorney*—Birch, Swindler, McKie & Beckett

ABSTRACT: An error recognition process for a system in which data is transmitted in a one out of m different modulation characteristics (e.g. frequencies) code and wherein errors at the transmitter, or in the transmission system can cause a plurality of modulation characteristics to exist simultaneously at the receiver. The method of the invention takes advantage of the fact that modulation products outside of the assigned frequency band result when two different modulation characteristics are combined in a nonlinear device. Frequencies outside of the assigned band are detected to furnish an error voltage which blocks the decoded output at the receiver to prevent errors.

METHOD AND APPARATUS FOR THE RECOGNITION OF ERRORS AT THE RECEIVER IN A DATA TRANSMISSION SYSTEM

This invention relates to the recognition of errors in received messages, and more particularly to detection of a phenomenon which occurs when a plurality of possible modulation characteristics are present, while only a single modulation characteristic should be present at the time, to recognize errors.

The invention is particularly useful in a data transmission system in which the messages are coded in binary form at the transmitter, in one of a number "*m*" modulation characteristics. In the transmission of coded message signals, the signals to be transmitted are scanned at equal time intervals by synchronizing signals and are identified by modulation characteristics corresponding to the coding. For example, the modulation characteristics can be frequency, amplitude, or phase shift, so that one of a plurality of frequencies may be transmitted to indicate the characteristic of the signal which is being transmitted. In such systems, when the message signals are irregular, assignment of transmission time to particular message signals is not attempted, since this is both costly and difficult. However, irregular operation is especially suitable for reception of messages from remote stations, so that measures must be taken to decrease the added susceptibility of this type of transmission to disturbance and resulting errors.

In a data collection system, for which this invention is particularly desirable, parallel transmission of information is preferred, so that the many remote data transmission systems can be kept both simple and inexpensive. Since in such systems the load on the message channel by the transmitting apparatus may only be very small, a very small voltage results at the contacts of the input apparatus, particularly in a keyboard system, so that the reliability of contact making decreases.

It is an object of the present invention to provide a method for recognition at the receiver of errors which have resulted at the transmitter by incorrectly inserted information, by erroneous input, or false coding, or by reason of disturbances in the transmission path.

The objective of the invention is achieved by use of the fact that when more than one modulation characteristic is transmitted simultaneously, modulation products occur, and these products lie outside of the frequency band in use. Consequently, in accordance with the invention, the modulation products may be filtered out and evaluated in a proper circuit, and in dependence upon that evaluation, the transmission of the decoded message at the receiver may be blocked or released.

DETAILED DESCRIPTION OF THE INVENTION

The invention will now be more fully described in conjunction with drawings showing a preferred embodiment thereof. In the drawings, FIG. 1 is a block diagram of a portion of the receiver of a known type of message transmission system;

The process to be described makes it possible to recognize at the receiver errors which result in the simultaneous occurrence of two or more modulation characteristics in the received assigned or used frequency band. As indicated earlier, such errors can be caused by the input system, by the coding system, or by disturbances in the transmission path. The error recognition process of the invention also provides protection for speech signals at the receiver, and this feature is particularly important when the data transmission occurs on a telephone channel.

The basic concept of the invention resides in the fact that modulation products result whenever more than one modulation characteristic, such as more than one modulation frequency, exists simultaneously. Coding errors, input errors and line disturbances can be recognized by evaluation of these modulation products.

In parallel transmission systems, it is known to use several different frequency groups for the transmission of coded message signals, and in each message signal to employ only one frequency of the assigned frequency group. For example, in the case of there being three different frequency groups, each having four frequencies, with only one tone to be emitted at any instant out of each frequency group, 3×1 from 4=$\binom{4}{1}^3$=64 different combinations are possible for the modulation characteristics.

Figure 1:
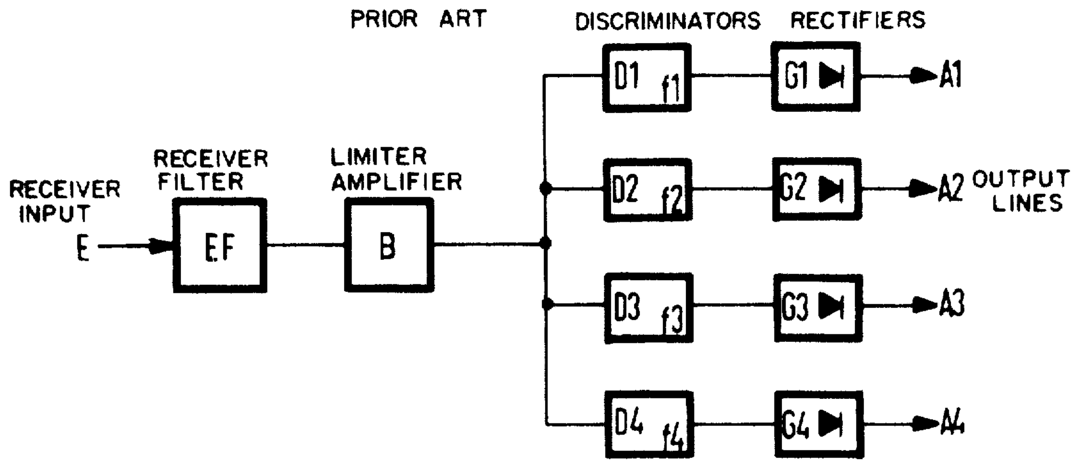

FIG. 1 shows a block diagram of a portion of a known transmission system receiver for selection and demodulation of signals which are transmitted by one out of four possible frequencies. The input E of the receiver supplies the modulated signal to a receiver filter EF, and the output of that filter is limited by limiter amplifier B. The modulated message for THIS channel may consist of one of the four possible frequencies *f*—*f*4. Therefore, the limited signal is supplied to four different discriminators D1—D4, each of which is tuned to a different one of the four frequencies. Each discriminator emits an output signal only if the frequency to which it is tuned appears at the output of limiting amplifier B. In the case of erroneous transmission, as by reason of a disturbance in the transmission system, a signal will occur simultaneously at a plurality of the different outputs A1—A4, rather than only in one of the outputs.

In the system of FIG. 1, this possibility of error is combated by the use of rectifiers G—G4, provided with a threshold value of response. If several frequencies are received simultaneously, the signal amplitude of each frequency following the limiting means is reduced, as compared to the signal amplitude when only a single signal is received. Consequently, the threshold value of the appropriate rectifiers are not reached, and the output is blocked at output lines A1—A4 for the duration of the disturbance which resulted in simultaneous reception of several frequencies. FIG. 1 shows a system for reception of a single frequency group, with four frequencies in the group. However, several different frequency groups can also be present, with only one frequency emitted in each frequency group.

Figure 2:
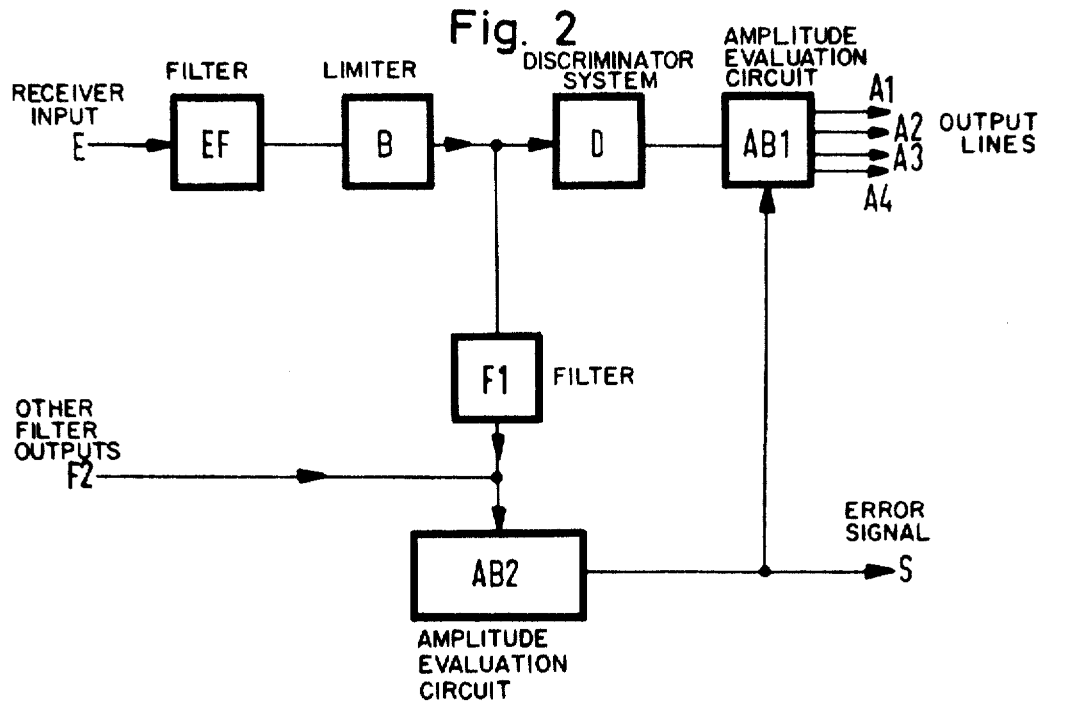
FIG. 2 shows a block diagram of a preferred embodiment of a receiver portion constructed in accordance with the invention.

FIG. 2 shows in block diagram form a preferred embodiment of a receiving system employing the method of the invention and constructed according to the principles of the invention for recognition of errors. In that system, the received signal E is supplied through receiver filter EF and is amplified in limiting amplifier B, similarly to the system of FIG. 1. However, the limited signal is supplied not only to a discriminator system D (which may be similar to the discriminators D1—D4 of FIG. 1), but that signal is also supplied to the input of a filter F1. The output of the discriminator system is supplied to an amplitude evaluation circuit AB1 which employs a threshold response, which can be achieved in the same fashion as in the rectifier circuit G1—G4, of FIG. 1. An output signal will appear on the output lines A1—A4, dependent upon the frequency of the signal received.

Filter F1 filters out the modulation products resulting from the simultaneous appearance of two different frequencies, that is, the sum and difference frequencies which lie outside of the employed or assigned frequency band. That filtered-out signal is then evaluated as to amplitude in an amplitude evaluation circuit AB2. If the signal exceeds a certain threshold value, there appears at the output of the evaluation circuit, AB2, a "disturbance" or error signal S. This signal both supplies an indication of disturbance in the receiver and also blocks the output lines A1—A4, by control of the amplitude evaluation circuit AB1 for the duration of the error. This blockage may be achieved by biasing the amplitude evaluation circuit AB1 in such fashion that no outputs may be supplied to the output lines A1—A4

As indicated in FIG. 2, the system may also provide for the outputs of other filters corresponding to filter F1 being supplied to the amplitude evaluation circuit AB2. This is indicated by connection of the input labeled F2 to the input of the evaluation circuit, indicating that the output of a filter sensitive to modulation products of frequencies in a different frequency band may be supplied to the evaluation circuit. In such case, the amplitude evaluation circuit AB2 will evaluate the sum of all modulation products resulting from the individual frequency groups and will control the emission of the message at the output of the receiver, in dependence upon the level of these modulation products.

Figure 3:
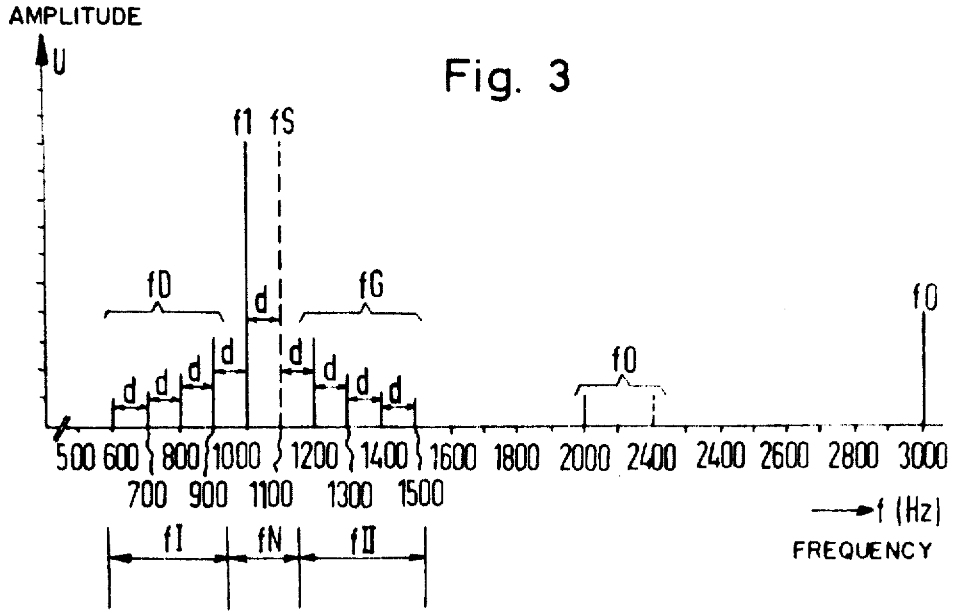
FIG. 3 is a graphic showing of modulation products occurring when two different modulation characteristics are present simultaneously within the assigned frequency band; and, FIG. 4 is a graphic showing of the frequency spectrum in a one out of four code, in which one out of four possible modulation frequencies is transmitted at any one instant.

FIG. 3 shows a frequency spectrum resultant from the presence of a pair of frequencies or tones within the employed or assigned frequency band ƒN. Frequency is plotted horizontally, and the amplitude of the modulation products and the harmonic frequencies of the signals are plotted vertically.

The true signal F1 1 (1,000 Hz.) is shown in the frequency band employed. If this tone or frequency were the only one supplied to the limiter amplifier, there would result if symmetrical limiting occurred, even-numbered harmonics ƒO (2,000, 4,000 Hz., etc.). If asymmetrical limiting were employed, even-numbered harmonics would also be present (2,000, 4,000 Hz., etc.).

In FIG. 3, in addition to the signal tone ƒ1, a disturbance or error signal ƒS (1100 Hz. is shown at a spacing *d* from the signal tone. As a result of simultaneous presence o f ƒ1 and ƒS, sum tones or frequencies ƒG, and difference frequencies ƒD exist, at successive different spacings *d* from the signal tone and from the error tone. All of these modulation products tones may be filtered out and rejected, because they lie outside of the frequency band ƒN within which the signal tones must appear.

The filter F1 is constructed in such fashion as to block the harmonic frequencies ƒO which result when only a single frequency is being received at any one instant. In its simplest form, a low-pass filter may suffice, to pass the tones having a frequency below the frequency band in use. On the other hand, the frequency filter F1 may be selected for the lower range ƒI and the upper range ƒII so as to pass the modulation products below and above the frequency band of interest ƒN, or only for the upper range ƒII.

As indicated, when several different frequency groups are employed for transmission of signals, the amplitude evaluation circuit AB2 may be used jointly for several groups of frequencies.

In order that the one out of four message is supplied to the output of the receiver only if no disturbance or error is recognized, the output lines A1—A4 can be controlled by means of gate circuits in such manner that upon the presence of any disturbance, all outputs are blocked.

Figure 4:
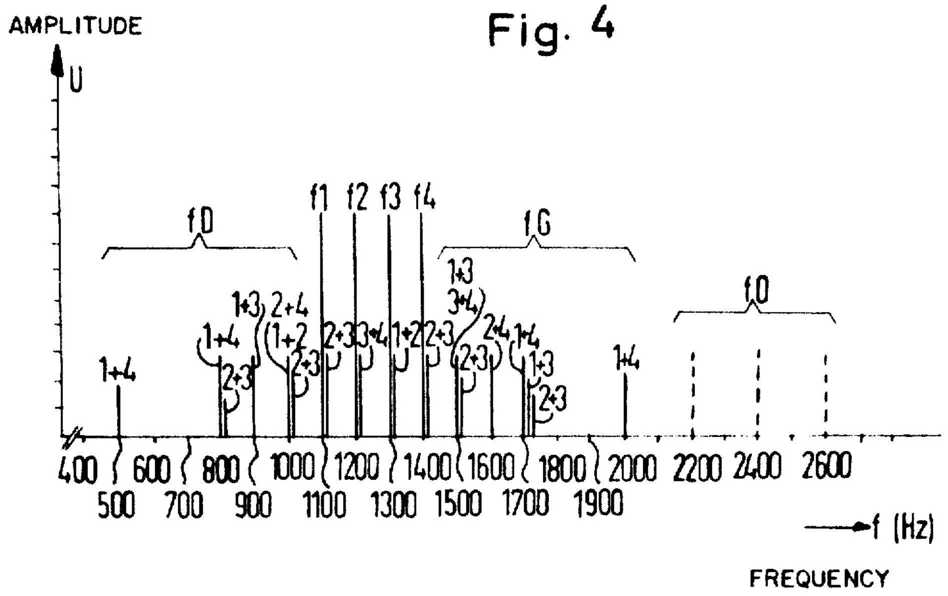

FIG. 4 shows the frequency spectrum for a one out of four code. In each case, one of the four signal tones ƒ1—ƒ4 is transmitted in the employed or assigned frequency band. If two tones appear simultaneously in the frequency band, modulation products result.

The presentation of FIG. 4 is similar to that of FIG. 3, and the amplitudes shown by the vertical lines are approximately representative of relative true magnitudes. As before, the values ƒO represent the harmonic frequencies, and they are shown in dotted lines. The representation shows the modulation products resulting upon limiting, with all possibly occurring combinations when two tones of the four possible tones are occurring simultaneously. However, only the difference tones ƒD and the sum tones ƒG, which lie outside of the employed frequency band are employed for amplitude evaluation to indicate the presence of error signals.

The invention has been described in conjunction with a preferred embodiment thereof. It will be evident that many variations may be made in the specific apparatus and techniques employed to perform the invention. Accordingly, the invention is not to be considered limited to the specific disclosure herein, but rather only by by the scope of the appended claims.

I claim:

1. Apparatus for detecting errors in received signals which are transmitted in binary coded form wherein each coded element of said signals omprises a single frequency selected from a predetermined group of frequencies comprising:
   filter means for sensing in said received signals modulation products occurring upon the appearance of more than one frequency of said predetermined group, said modulation products lying outside of the frequency band of said coded signals, but within a predetermined band width,
   evaluation circuit means for evaluating the amplitude of the signal resulting from the said sensed modulation products and for producing an error signal when said signal resulting from said modulation products exceeds an amplitude of a predetermined value, and
   output means for said received signals and having said error signal coupled thereto, said output means being adapted to be blocked to prevent the passage of said received signals thereto when said error signal is present.

2. The apparatus defined in claim 1 wherein said evaluation circuit is adapted to evaluate the disturbance modulation products in a plurality of groups o f frequencies.

3. A method for detecting errors in received data signals by using one of a predetermined group of frequencies for each code element of the signal, and wherein the disturbances caused by the actuation of more than one of said frequencies at a time are detected as errors, and comprising the steps of:
   filtering the received signals so that a signal corresponding to the modulation products of more than one of said frequencies lying outside of the transmission band width of said data signals, but within a predetermined band width, is filtered out,
   evaluating said filter signal and producing an error signal when the amplitude of said filtered signal exceeds a predetermined value, and
   blocking the passage of the date signals through a receiver means therefore, when an error signal is present.

4. The method of claim 1, in which said filtered signal is developed only from frequencies lying above said assigned frequency band.

5. The method of claim 1, in which said filtered signal is developed only from frequencies lying below said assigned frequency band.

6. The method of claim 1, in which filtered signal is developed by filtering out modulation products, to the exclusion or harmonics of frequencies within said assigned frequency band.

7. The method of claim 1, in which signals within said assigned frequency band are limited and then discriminated as to said modulation characteristics to decode the received signal to furnish an output signal (A1-A4) representative of the data,
   the limited signals being also filtered (F1) to develop said filtered signal only from the modulation products lying outside of said assigned frequency band, the said filtered signal then being evaluated as to amplitude (AB2) to provide an error signal (S) when the voltage exceeds a predetermined amplitude, and said error signal when present blocks any said output signal.